Oct. 4, 1927.
L. H. CHURCH
1,644,305
CABLE CONNECTER
Filed Aug. 18, 1925
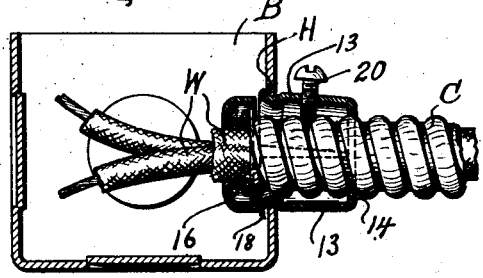
Fig. 1
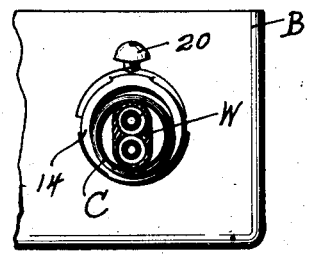
Fig. 2
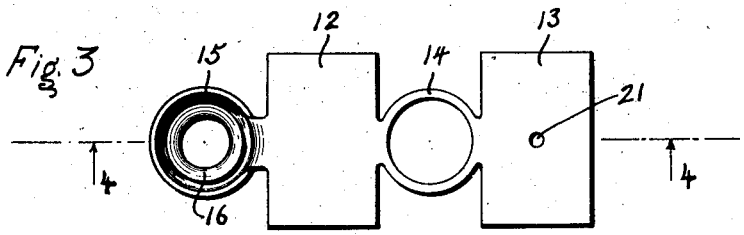
Fig. 3
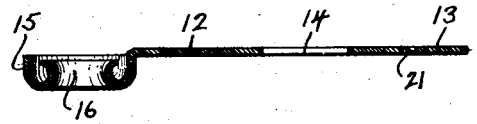
Fig. 4
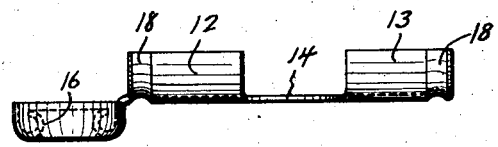
Fig. 5
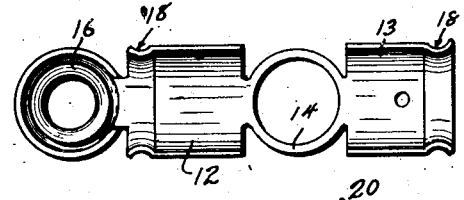
Fig. 6
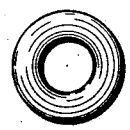
Fig. 7
Fig. 8
Fig. 9
INVENTOR
Lewis H. Church
BY
ATTORNEYS Patented Oct. 4, 1927.

1,644,305

UNITED STATES PATENT OFFICE.

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed August 18, 1925. Serial No. 50,997.

This invention relates to cable connecters and more particularly to an improved cable connecter having a cable entry ring and bushing ring, and which connecter may be stamped from sheet metal and be wholly of integral one piece structure, or it may be made of separate parts, whichever the manufacturer may desire.

An object of the invention is to produce in and with a connecter sleeve of any suitable type, improved sleeve end rings, a feature being, regardless of the particular type of connecter sleeve, that the rings are full fashioned uncut rings; one ring being employed as a cable entry ring through which the armored cable passes into the sleeve, while the other ring is flared and drawn to make a bushing out through which the wires only of the cable are protectively guided as they pass from the sleeve connecter into a box; and this improvement lends itself well to the manufacture of split sleeve expanding connecters.

A further object of the invention among others is to produce a cable connecter from a single sheet metal blank or stamping which blank is fashioned into a tubular sleeve formed integrally with two rings, one ring being located at one end of the sleeve and being drawn and flared to produce an ovaled smooth mouth continuous circular bushing to protect insulation on cable wires as aforesaid, and the other ring being located at the other end of the sleeve and having a restricted opening through which a cable armor is passed and the last mentioned ring on the outer sleeve end is also intended if desired to aid in fixing the cable armor in the connecter sleeve.

An additional object of this invention is to produce on and with an expansible sleeve type connecter composed of a plurality of expandable sections for example two parts, a rigid full circular bushing out through which wires of the cable pass from the connecter into the box together with an end cable entry ring of restricted size just large enough to admit the cable thereinto so as to cause the cable which enters the sleeve to close the hole defined by the ring, and this ring may be designed to aid in fixing the armored cable in the sleeve. In this way the cable closes the outer opening into the sleeve and the sleeve itself being expansible, in the form of the invention shown or preferred form, may be easily anchored in boxes having holes which may vary in size.

The accompanying drawings illustrate a preferred form of the invention wherein my connecter is fashioned from a single sheet metal stamping, although it may in fact be made of separately stamped parts.

Figure 1 shows a longitudinal sectional box assembly view of the connecter mounted in a box and anchoring a cable to the box; and Figure 2 is an outside end view of the connecter box and cable assembly.

Figure 3 is a plan view of the metal blank after it is stamped from sheet metal and after the ring bushing is formed up; and Figure 4 is a longitudinal section taken on the line 4—4 of Figure 3.

Figure 5 is a side elevation of the sheet metal blank partly formed up with the two sleeve plates curved on an appropriate radius; and Figure 6 is a plan view thereof.

Figures 7, 8 and 9 are respectively, front end, side and rear end elevations of the connecter.

It is desirable that a small size neat and inexpensive cable connecter be provided to anchor or fix armored cable C within the hole H of electrical outlet fixture boxes B and at the same time the rubber or insulation covered wires W should be protected from abrasion and damage on the sharp jagged edges of the end of the armored cable as well as be protected at the point of entry into the box. In many cases, it is desirable that each end of the sleeve be closed so as to provide a neat and sealed piece of work after the assembly of the box, cable and connecter is completed; and to these ends my invention is directed.

The connecter is cut or stamped from sheet metal and preferably comprises two sleeve plates 12 and 13 spaced apart and integrally joined together by necks to a cable entry ring 14. The cable entry ring 14 is preferably disposed between or in the middle of the sleeve plates 12 and 13 and by virtue thereof is located at the outer end of the sleeve when the folding operation is carried out on the two arcuate sleeve plates 12 and 13. An end ring 15 with a punched drawn and flared bushing mouth 16 is integrally joined at one end of the sleeve plate 12 and is located at the inner other end of the sleeve when the aforesaid folding operation is completed. The wire bushing 16 and the cable entry ring 15 are rigid and unchanging as to diameter but the sleeve 12—13 is in the present case made expansible between the rigid end rings. The plural section sleeve is thus constructed to afford efficient and quickly operative connecter anchorage means by which the sleeve is anchored in a box hole as will be more fully explained, although any other suitable anchorage means may be used with my improved double-ended ring structure.

Referring now to Figures 5 and 6, it is observed that the sheet metal blank 12—13 is next submitted to a forming operation by which the sleeve plates 12 and 13 are pressed into circular form on a desired radius thereby providing two half curved sleeve parts 12 and 13 with the armored cable entry ring 14 left in the middle of the sleeve plates and the bushing ring 16 at one end of the stamping.

The next operation in forming the cable connecter is to bend up the arcuate sleeve parts 12 and 13 in relation to the ring 14 and this bending occurs along the bending line or zone defined by the tangent to the ring 14 which places the ring 14 right angular to the sleeve parts. When this is done the connecter assumes the form shown in Figures 7, 8 and 9 thereby providing a cylindrical sleeve 12—13 which has a restricted ring 14 integral at one end and a restricted bushing ring 16 integral at the other end. This improved cable structure is characterized by having solid rings at each end of the sleeve thus substantially closing each end of the sleeve and making each end of the sleeve connecter rigid and immovable but leaving the central sleeve portion 12—13 expansible so that it may by expansion be anchored to and within a box hole or cable opening within the box.

Connecter and box hole anchorage means, for example a groove 18, is made in each sleeve section 12 and 13 by which the sleeve is caused to grip and anchor against the internal rim of a box hole H when the parts 12 and 13 are forcibly expanded. It is observed how the sleeve 12—13 is expansible at one end by forcibly causing the grooved end 18 of the sleeve part 13 to move relatively to the other parts of the connecter which remain stationary. The half circular sleeve section 13 moves by bending itself along the tangent joinder neck line by which it is connected to the ring 14.

Cable clamping or operating means of any suitable character, such as a screw 20, by which a cable is fixed within the sleeve, is threaded into a screw hole 21 made in one of the sleeve plates 12 or 13 and this screw is adapted to bring considerable pressure to bear down upon the cable C and thus fix and secure the cable within the sleeve and simultaneously with this operation the pressure of the screw causes the half sleeve section 13 to bend or hinge on the ring 14 thereby bringing the grooves 18 in each sleeve half against the rim H of the box B with great pressure. The screw 20 therefore simultaneously performs the double function of fixing the cable C within the sleeve and anchoring the sleeve within the box hole H.

The internal diameter of the ring 14 is preferably just large enough to receive the cable C thereinto and thus avoid any great amount or excess clearance between the armored cable wall and the internal rim of the ring. In this way little clearance or play is left after the cable C is introduced into the connecter sleeve and thus the sleeve is substantially closed at its outer end so as not to leave an opening where the cable enters. The internal diameter of the ring 14 remains the same size irrespective of the amount of expansion taking place in the sleeve sections 12 and 13. In other words the ring 14 remains constant in diameter but the sleeve 12—13 is slightly variable in diameter in order to easily fit into a box hole and then be expanded and anchored therein.

Another distinguishing feature in connection with the cable entry ring 14 which I will explain relates to the capacity of the ring itself to help firmly fix the cable C within the sleeve. By observing the assembly view of Figure 1 it is clear that a portion of the internal rim of the ring 14 rests against the armored cable C and usually a portion of the ring rests within a groove of the cable. The internal rim of the ring 15 thus engages and supports the cable wall C slightly away from the internal circular surface of the sleeve 12—13. Likewise the bushing ring 16 at the other end of the sleeve also tends to support the cable slightly away from the inside of the wall of the sleeve. In other words the cable C rests on the ring 14 as well as rests on the internal grooves 18, and furthermore the insulated wires W touch or rest against the bushing mouth 16. Therefore when suitable cable clamping or operating means, such as a screw 20, bears down upon the cable C it follows that the thin ring 14 pinches into and secures a very strong hold and engagement upon the cable C thus cooperating with the screw 20 and contributing largely to the fixing of the cable within the sleeve as well as substantially closing up the outer end of the connecter sleeve where the cable armor enters said sleeve.

Both rings 14 and 16 remain integral with the sleeve plates by a narrow strip of attaching stock or neck left by the punching tool in the manufacturing operation and this narrow strip of material permits an easy bending operation to take place when the two half-round sleeves are bent up to form the complete sleeve. The narrow strip of attaching stock which holds the plates 12 and 13 integral with one of the rings, the ring 14, may in some cases be supplanted by other more appropriate structure so that a sleeve of any appropriate type may in fact be used with the improved sleeve end rings.

A cable connecter of this type has the advantage of continuous unbroken full fashioned and uncut solid rings at each end of the sleeve where the armored cable C enters the sleeve and where the wires W thereof are protectively guided by the bushing 16 and pass out from the sleeve into the box and this is true without in any manner interfering with the universal expansibility or the changing size of the sleeve and inasmuch as the connecter preferably comprises a single one piece structure, it follows that it is economical to manufacture.

An important feature of the invention is the carrying of a continuous or unsplit ring at each end of the connecter member. The connecter member between the rings includes anchorage means to engage and seat against the box hole edge and the connecter member also carries screw or other operating means by which the connecter is anchored in the box hole and the cable is fixed to the box as well. The connecter member is shown as a split sleeve but other forms of construction may be used.

What I claim is:

1. A cable connecter adapted to positively attach cable with its wires in a box hole comprising, a split sleeve capable of expansion within a box hole, box hole anchorage means made on the sleeve by which it grips against the rim of the box hole due to the aforesaid expansion, cable clamping means carried on the sleeve adapted to bear on a cable to fix it in the sleeve and simultaneously effect expansion aforesaid, and a ring integrally formed on the sleeve at each end thereof through which the cable enters the sleeve and the wires thereof pass out of the sleeve.

2. A cable connecter comprising, a sleeve adapted to fit within a box hole, said sleeve made with splits therein dividing it into separable relatively expansible sections, box hole anchorage means carried on the sleeve and adapted to anchor said sleeve in a box hole, a screw carried by one of the sleeve sections to expand the sleeve rendering operative the aforesaid anchorage means and simultaneously gripping a cable to fix it in the sleeve, and a ring integrally formed with the sleeve at each end thereof and folded across said sleeve to produce restricted sleeve end openings.

3. A cable connecter comprising, a flat sheet metal blank consisting of a pair of rectangular sleeve plates fashioned into half round sections brought together to make a sleeve capable of being spread apart at one end, a cable entry ring disposed between the sleeve plates integral with both of said plates forming a restricted opening end closure at one end of the sleeve through which a cable is inserted, a bushing ring integral with one of the plates and bent up rightangular to the sleeve through which wires from the cable are protectively guided and against which the cable end rests, box hole anchorage means carried by the sleeve by which it is anchored within a box hole, and a cable clamp screw carried by the sleeve to bear against a cable fixing it in the sleeve and simultaneously spreading one end of the sleeve to render effective the anchorage means.

In testimony whereof I affix my signature.

LEWIS H. CHURCH.